United States Patent
Kamiyama et al.

(10) Patent No.: US 6,674,541 B1
(45) Date of Patent: Jan. 6, 2004

(54) METHOD FOR TRANSMITTING FACSIMILE DATA BETWEEN FACSIMILE APPARATUSES THROUGH AN INTERNET PROTOCOL NETWORK AND RELAY APPARATUSES USED IN THE METHOD

(75) Inventors: Hideki Kamiyama, Kawasaki (JP); Kazuki Yoshiura, Kawasaki (JP); Katsuo Gomi, Kawasaki (JP); Hiroaki Hamano, Kawasaki (JP); Ryoichi Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/473,227

(22) Filed: Dec. 27, 1999

(30) Foreign Application Priority Data

Mar. 19, 1999 (JP) .................................. 11-076762

(51) Int. Cl.$^7$ ........................... H04N 1/00; G06R 15/00
(52) U.S. Cl. ................... 358/1.15; 379/100.09; 379/100.13; 358/404; 358/407
(58) Field of Search .................. 358/400, 407, 358/1.15, 434, 440; 379/100.01, 100.06, 100.09, 100.13

(56) References Cited

U.S. PATENT DOCUMENTS

| | | | | |
|---|---|---|---|---|
| 5,633,916 A | * | 5/1997 | Goldhagen | 379/67 |
| 6,341,133 B1 | * | 1/2002 | Kawamoto et al. | 370/401 |
| 6,463,051 B1 | * | 10/2002 | Ford | 370/352 |
| 6,542,472 B1 | * | 4/2003 | Onuma | |

* cited by examiner

Primary Examiner—Jerome Grant, II
(74) Attorney, Agent, or Firm—Katten Muchin Zavis Rosenman

(57) ABSTRACT

A method for transmitting facsimile data between facsimile apparatuses each connected to a relay apparatus, and relay apparatuses being connected each other through an internet protocol network, includes steps of: performing an address conversion from a telephone number of a facsimile apparatus of the reception side to an IP address corresponding to the telephone number; transmitting a request for TCP connection to a relay apparatus corresponding to a destination of the IP address when receiving an identifying signal which indicates transmission of the facsimile data from the facsimile apparatus of the sending side; and transmitting the facsimile data to the relay apparatus corresponding to the destination of the IP address based on the TCP connection.

8 Claims, 8 Drawing Sheets

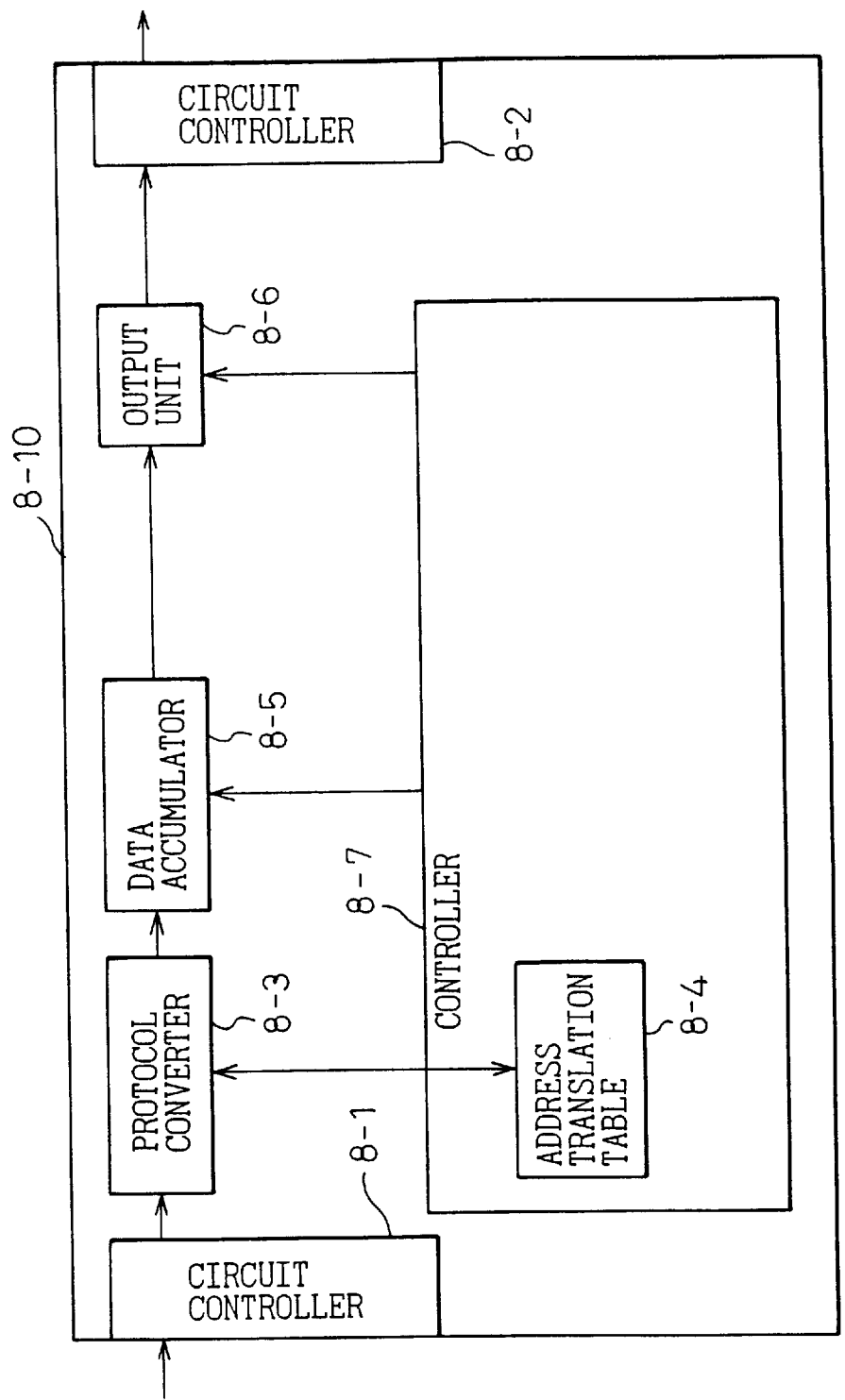

METHOD FOR TRANSMITTING FACSIMILE DATA BETWEEN FACSIMILE APPARATUSES THROUGH AN INTERNET PROTOCOL NETWORK AND RELAY APPARATUSES USED IN THE METHOD

BACKGROUND OF THE INVENTION

1. Field of the Invention

The present invention relates to a method for transmitting facsimile data between facsimile apparatuses provided in sending side and reception side. Further, the present invention relates to relay apparatuses provided in the sending side and the reception side, and the relay apparatus of sending side is connected to the relay apparatus of reception side through an internet protocol network, or through a wide area network (WAN). In this case, not only facsimile apparatuses, but also sound data terminals are connected to the internet protocol network.

2. Description of the Related Art

When transmitting facsimile data through an internet protocol network, in a relay apparatus, for example, a router or a gateway, which is connected between the facsimile apparatus and the internet protocol network, the facsimile data are treated based on the same coding method as sound data, and transferred to a relay apparatus of destination, for example, a router or a gateway, based on a UDP (User Datagram Protocol).

In general, by using the UDP, it is possible to execute a protocol process with high speed and small overhead of the network so that it is possible to realize data transfer for which high immediate-transfer is required, for example, communication of sound data between sound terminals. In this case, however, since the UDP has no error correction function or re-transmission function, the reliability of this protocol is low.

SUMMARY OF THE INVENTION

The object of the present invention is to provide a method for transmitting facsimile data between facsimile apparatuses which can improve transmission quality of the facsimile data on the internet protocol network, and can realize uniform traffic load (or circuit load) on the internet protocol network so that it is possible to prevent deterioration of throughput due to overload of the traffic load on the whole of the internet protocol network.

Another object of the present invention is to provide a relay apparatus provided in the sending side and the reception side, and the relay apparatus of the sending side is connected to the relay apparatus of reception side through an internet protocol network, or through a wide area network (WAN). In this case, not only facsimile apparatuses, but also sound data terminals, are connected to the internet protocol network.

In accordance with a first aspect of the present invention, a method for transmitting facsimile data between a facsimile apparatus of a sending side and a facsimile apparatus of a reception side, the facsimile apparatus of the sending side being connected to a relay apparatus of the sending side, the facsimile apparatus of the reception side being connected to a relay apparatus of the reception side, and the relay apparatus of the sending side being connected to the relay apparatus of the reception side through an internet protocol network, includes steps of:

performing an address conversion from a telephone number of a facsimile apparatus of the reception side, which is transmitted from a facsimile apparatus of the sending side when setting a call, to an IP address corresponding to the telephone number;

transmitting a request for establishment of TCP connection including a flow control and re-transmission function, to a relay apparatus corresponding to a destination of the IP address, when receiving an identifying signal which indicates transmission of the facsimile data from the facsimile apparatus of the sending side; and transmitting the facsimile data to the relay apparatus corresponding to the destination of the IP address based on the TCP connection.

In a preferred embodiment, the above step of transmitting the request for establishment of the TCP connection comprises a step of transmitting a particular port number, which indicates transmission of the facsimile data, with the request for establishment of the TCP connection.

In another preferred embodiment, the above step of transmitting the facsimile data based on the TCP connection comprises a step of comparing a circuit load in the internet protocol network with a threshold value which was previously determined based on a service level for communication for transmitting the facsimile data, and transmitting the facsimile data when the circuit load is smaller than the threshold value.

In still another preferred embodiment, the above step of transmitting the facsimile data based on the TCP connection comprises a step of controlling transmission timing of the facsimile data based on transmission timing which was previously determined in accordance with the circuit load and service level of communication.

In accordance with a second aspect of the present invention, a relay apparatus connected to facsimile apparatuses and further connected to an internet protocol network, includes:

an address conversion unit for performing an address conversion from a telephone number of a facsimile apparatus of the reception side, which is transmitted from a facsimile apparatus of the sending side when setting a call, to an IP address corresponding to the telephone number;

transmitting unit for transmitting a request for establishment of TCP connection including a flow control and re-transmission function, to a relay apparatus corresponding to a destination of the IP address, when receiving an identifying signal which indicates transmission of the facsimile data from the facsimile apparatus of the sending side; and a transmitting unit for transmitting the facsimile data to the relay apparatus corresponding to the destination of the IP address based on the TCP connection.

In a preferred embodiment, the unit for transmitting the request for establishment of the TCP connection comprises a structure of transmitting a particular port number, which indicates transmission of the facsimile data, with the request for establishment of the TCP connection.

In another preferred embodiment, the unit for transmitting the facsimile data based on the TCP connection comprises a means for comparing a circuit load in the internet protocol network with a threshold value which was previously determined based on a service level for communication for transmitting the facsimile data; a unit for transmitting the facsimile data when the circuit load is smaller than the threshold value; and a means for temporally accumulating the facsimile data.

In still another preferred embodiment, the unit for transmitting the facsimile data based on the TCP connection comprises a unit for controlling transmission timing of the facsimile data based on transmission timing which was previously determined in accordance with the circuit load and service level of communication.

BRIEF EXPLANATION OF THE DRAWINGS

FIG. 8 is a schematic block diagram for explaining a relay apparatus used for transmitting the facsimile data through a conventional internet protocol network.

DESCRIPTION OF THE PREFERRED EMBODIMENTS

Figure 1:
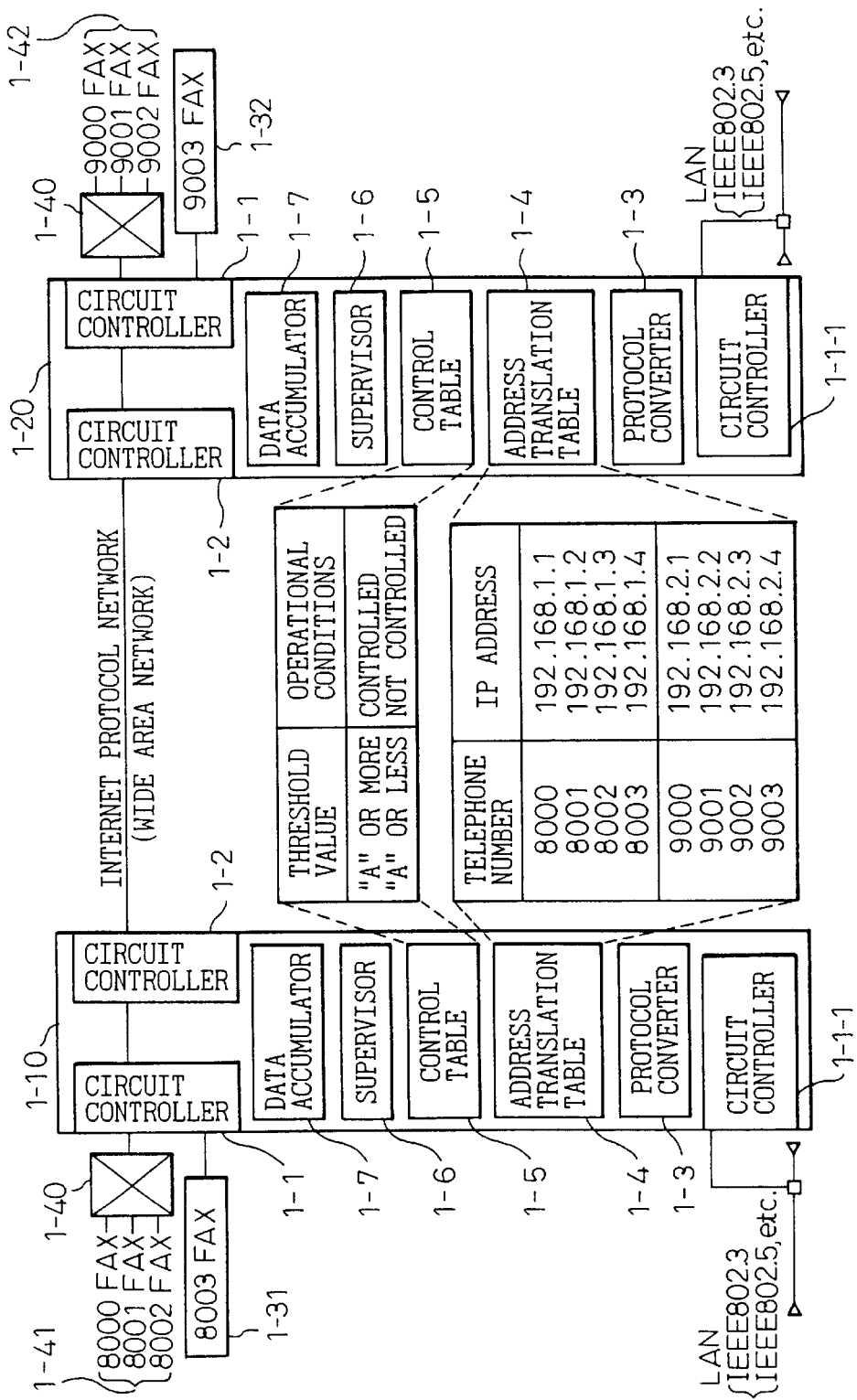
FIG. 1 is a schematic block diagram for explaining transmission of facsimile data through an internet protocol network according to the present invention.

Before describing preferred embodiments, a conventional art and its problem will be explained below.

FIG. 8 is a schematic block diagram for explaining a relay apparatus used for transmitting facsimile data through a conventional internet protocol network. In FIG. 8, reference number 8-10 is a relay apparatus, for example, a router or a gateway, 8-1 is a circuit controller provided to an input of the facsimile data and connected to a facsimile circuit, 8-2 is a circuit controller provided to an output of the facsimile data and connected to an internet protocol network, 8-3 is a protocol converter, 8-4 is an address translation table, 8-5 is a data accumulator, 8-6 is an output unit, and 8-7 is a controller.

The controller 8-7 includes the address translation table 8-4, and controls the data accumulator 8-5 and the output unit 8-6. When the circuit controller 8-1 receives a request to call from a facsimile apparatus through the facsimile circuit in response to a dialing signal (i.e., a destination telephone number) received in the controller 8-1, the controller 8-7 searches an IP (Internet Protocol) address corresponding to the dialing signal from the address translation table 8-4, and outputs the IP address to the protocol converter 8-3.

The protocol converter 8-3 converts facsimile data which is input from the circuit controller 8-1, to a UDP (User Datagram Protocol) datagram with sound data. In this case, the IP address is used as a destination address.

The data accumulator 8-5 accumulates the UDP datagram sent from the protocol converter 8-3 in accordance with control of the controller 8-7. The output unit 8-6 outputs the UDP datagram accumulated in the data accumulator 8-5 in accordance with control of the controller 8-7, and transmits the UDP datagram on the internet protocol circuit through the circuit controller 8-2.

In the above conventional art, the UDP is utilized for transmission of the facsimile data through the internet protocol network. In this case, the transmission of the facsimile data is treated at the same service level for communication as transmission of the sound data, when transmitting the facsimile data on the internet protocol network.

On the other hand, a high transmission quality must be required when transmitting the facsimile data, compared to transmission of the sound data. This requirement is based on a transmission characteristic of the facsimile data. However, as mentioned above, since the transmission of the facsimile data is treated at the same service level for communication as the transmission of the sound data, and since the UDP is used for transmitting the facsimile data on the internet protocol network, it is difficult to perform an error recovery control, for example, flow control, re-transmission control, etc., for the facsimile data on the internet protocol network.

Further, in general, there are many facsimile data which do not need immediate transfer to destinations. That is, many facsimile data have characteristics which are different from the sound data and communication data used between interactive terminals, in which these data share the internet protocol network with the facsimile data.

In this case, however, since the facsimile data is treated on the internet protocol network as well as the above-mentioned the sound data and communication data in which the immediate transfer is required, if a certain route on the internet protocol network becomes high traffic state, this influence affects another communication data in which the immediate transfer is required. This is because such route is shared by the facsimile data which should be basically transferred at low traffic. As a result, there is a problem in which throughput of the whole of internet protocol network becomes worse.

Therefore, the present invention aims to improve the transmission quality of the facsimile data when transmitting it on the internet protocol network, and to realize uniform traffic load (or circuit load) on the internet protocol network, and prevent deterioration of throughput due to overload of the traffic load on the whole of the internet protocol network.

FIG. 1 is a schematic block diagram for explaining transmission of the facsimile data through the internet protocol network according to the present invention. In FIG. 1, reference numbers 1-10 and 1-20 are relay apparatuses, for example, routers or gateways (in this embodiment, 1-10 is used in a sending side, and 1-20 is used in a reception side); 1-31 and 1-32 are facsimile apparatuses each directly connected to the relay apparatuses 1-10 and 1-20 (in this embodiment, 1-31 is used in the sending side, and 1-32 is used in the reception side); 1-40 is a sound exchange provided on both sending and reception sides); 1-41 and 1-42 are facsimile apparatuses connected to the sound exchange 1-40. The facsimile apparatuses 1-31, 1-32, 1-41 and 1-42 are typical facsimile apparatuses each of which is connected to a telephone line in both sending and reception sides in order to transmit or receive the facsimile data.

Each relay apparatus 1-10 and 1-20 has the same structure, and includes a circuit controller 1-1 having an interface function for the telephone line. Further, each circuit controller 1-1 is directly connected to the facsimile apparatus 1-31 and 1-32, and further connected to the facsimile apparatuses 1-41 and 1-42 through the sound exchange 1-40.

Further, each relay apparatus 1-10 and 1-20 includes a circuit controller 1-2 having the interface function for the internet protocol network, and is connected to a wide area network (WAN) on the internet protocol network. Further, each relay apparatus 1-10 and 1-20 includes a circuit controller 1-1-1 having the interface function for a local area network (LAN) so that a relay apparatus can be connected to the LAN.

Figure 2:
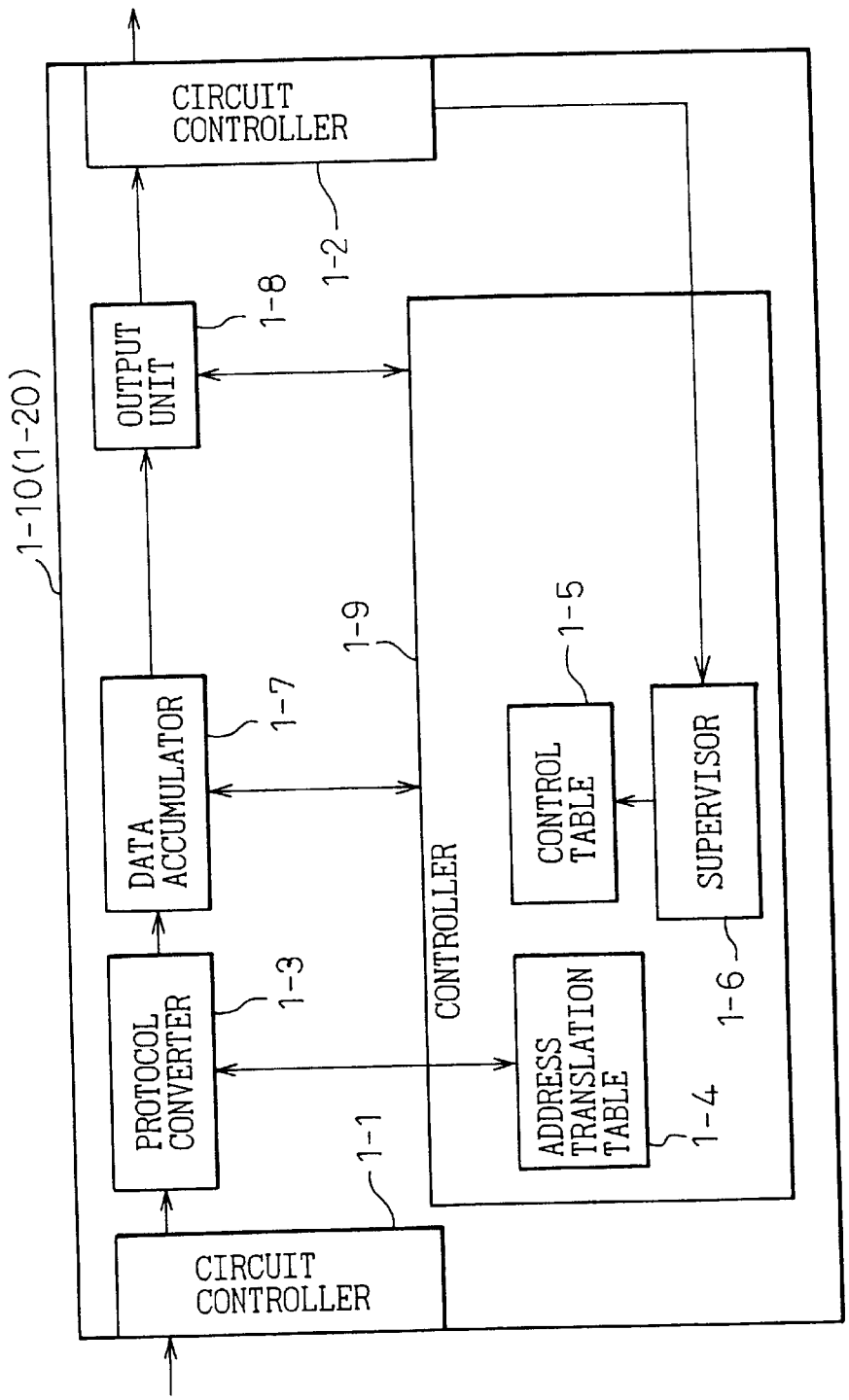
FIG. 2 is a schematic block diagram for explaining a relay apparatus according to the present invention.

FIG. 2 is a schematic block diagram for explaining a relay apparatus according to the present invention. When the circuit controller 1-1 having the interface function for the telephone line receives a call set-up signal from the facsimile apparatus and detects a calling signal (a CNG signal), the circuit controller 1-1 recognizes as it is a request of transmission of the facsimile data, and sends the request of transmission to the protocol converter 1-3.

When the protocol converter 1-3 receives the request of sending of the facsimile data, the protocol converter 1-3 converts the data transfer protocol from the UDP for transferring the sound data, to a TCP (Transmission Control Protocol) having high transmission quality and reliability. When converting from the UDP to the TCP, the protocol converter 1-3 adds a proper TCP application number to the TCP in accordance with the service level for communication when transmitting the facsimile data. Further, the protocol converter 1-3 includes a function for performing a request for establishment of TCP connection.

The address translation table 1-4 includes a function for managing each telephone number and an IP address corresponding to the telephone number for each telephone or facsimile apparatus.

A supervisor 1-6 always checks a load state of the circuit on the internet protocol network, and sends the load state of the circuit to a control table 1-5. The control table 1-5 stores threshold values corresponding to the load state of the circuit, which are previously registered, on the internet protocol network, and the information which are related to a transmission timing in accordance with the service level for communication. A controller 1-9 includes a function which accumulates the facsimile data, and controls the transmission timing for a data accumulator 1-7 and an output unit 1-8 in accordance with the information stored in the control table 1-5.

The data accumulator 1-7 and the output unit 1-8 temporarily accumulate the facsimile data based on control in the controller 1-9 in accordance with the load state of the circuit which is checked by the supervisor 1-6, and outputs the facsimile data to the circuit controller 1-2. Further, the circuit controller 1-2 outputs the facsimile data to the relay apparatus 1-20 in the reception side through the internet protocol network.

Next, the transfer operation of the facsimile data from the facsimile apparatus 1-31 (connected to the relay apparatus 1-10) to the facsimile apparatus 1-32 (connected to the relay apparatus 1-20) will be explained in detail with reference to FIG. 1 below.

For example, when the telephone number "9003" is dialed from the facsimile apparatus 1-31 to the facsimile apparatus 1-32, the relay apparatus 1-10 refers to the address translation table 1-4, searches a destination IP address which corresponds to the telephone number "9003", and recognizes the destination IP address "192.168.2.4".

As well as transmission of the sound data, first, the relay apparatus 1-10 searches a destination relay apparatus (i.e., a router or gateway) which corresponds to the destination IP address which was obtained from the address translation table 1-4, and transmits the telephone number of the destination facsimile apparatus, as the UDP data, to the destination relay apparatus 1-20.

When the relay apparatus 1-10 of the sending side transmits the telephone number to the destination relay apparatus 1-20 based on the UDP data, the destination relay apparatus 1-20 receives an IP address of the sending side so that it is possible to establish both-way connection based on the UDP between the relay apparatus 1-10 of the sending side and the destination relay apparatus 1-20 of the reception side.

After establishing the UDP connection, the facsimile apparatus 1-31 of the sending side sends the CNG signal, which corresponds to the T-30 transmission control procedure (ITU-T) which distinguishes a non-sound data terminal, i.e., a facsimile terminal, to the relay apparatus 1-10.

When the relay apparatus 1-10 of the sending side receives the CNG signal, the relay apparatus 1-10 detects that the transmission is performed for the facsimile data. Further, the relay apparatus 1-10 refers to the control table 1-5, and determines the service level for communication on the internet protocol network in accordance with the information stored in the control table 1-5.

The relay apparatus 1-10 of the sending side transmits the service level for communication with a request for establishment of the TCP connection (below, a request for a TCP connection) to the relay apparatus 1-20 of the reception side.

Figure 3:
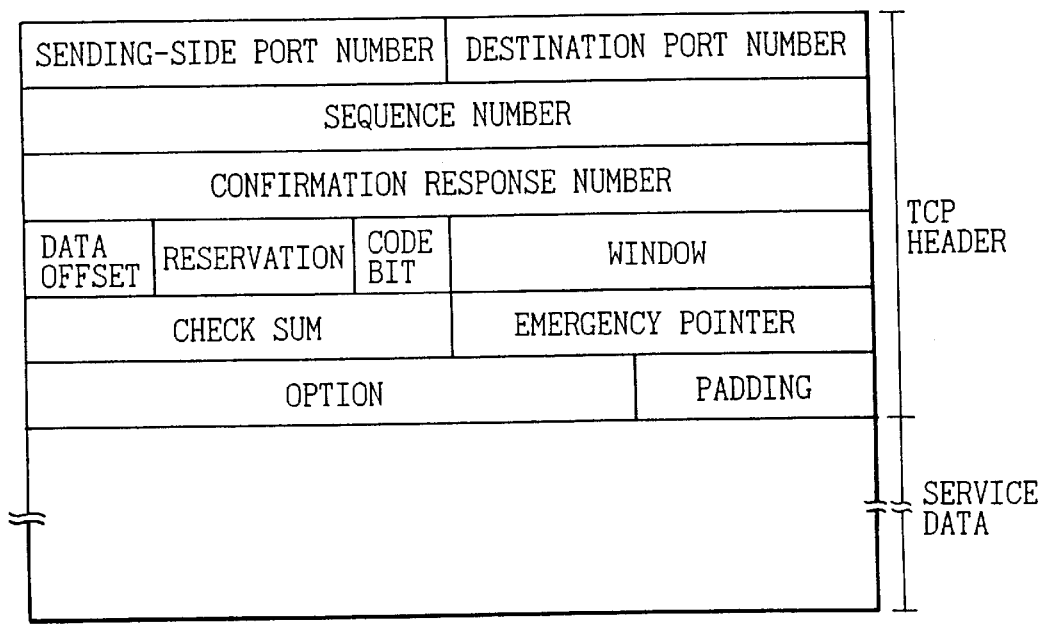
FIG. 3 is a view for explaining a header format of the TCP.

FIG. 3 is a view for explaining a header format of the TCP. The header format of the TCP at least includes areas for storing a port number of the sending side, a destination port number, a sequence number, and a confirmation response number. In this case, it is possible to make a particular port number correspond to the service level for communication. The particular port number is stored in the header of the TCP so that it is possible to send the service level for communication to the destination.

In FIG. 3, since a data off-set, a reservation, a code bit, a window, a check sum, an emergency pointer, an option, padding, and service data are not related to the present invention, the explanation is omitted.

The relay apparatus 1-20 of the reception side converts the request for the TCP connection to the CNG signal, and transmits the CNG signal to the facsimile apparatus 1-32 of the reception side. Further, the relay apparatus 1-20 compares the requested service level with the service level which was previously stored in the control table 1-5, and selects a lower service level.

When the facsimile apparatus 1-32 of the reception side receives the CNG signal from the relay apparatus 1-20, the facsimile apparatus 1-32 sends a response identifying signal (a CED signal). When the relay apparatus 1-20 receives the CED signal, the relay apparatus 1-20 of the reception side converts the CED signal to the response for establishment of the TCP connection (i.e., response for the TCP connection), and stores the service level having a low value which was selected in accordance with comparison of the service level for communication. Further, the relay apparatus 1-20 of the reception side transmits the service level having the low value to the relay apparatus 1-10 of the sending side.

The relay apparatus 1-10 of the sending side converts the response for the TCP connection to the CED signal, and sends the CED signal to the facsimile apparatus 1-31 of the sending side. Further, the relay apparatus 1-10 stores the service level for communication, which was sent from the facsimile apparatus 1-32 of the reception side, into the control table 1-5.

In accordance with above procedures, the TCP connection is established between the facsimile apparatus 1-31 of the sending side and the facsimile apparatus 1-32 of the reception side so that it is possible to transfer the facsimile data based on the TCP.

The control table 1-5 in the relay apparatus 1-10 is provided for performing a queue control of the facsimile data which is output from the circuit controller 1-2, in accordance with the service level which is previously determined, and in accordance with the load state of the circuit on the internet protocol network.

The supervisor 1-6 in the relay apparatus 1-10 always checks the load state of the circuit on the internet protocol network. When the load state exceeds a predetermined threshold level, and when the data to be transmitted is determined as the facsimile data based on a TCP application number, the supervisor 1-6 determines a presence or absence of necessity of the immediate transfer based on a transmission timing information which was previously determined in the control table 1-5, even if a turn of the transmission comes round the facsimile data. The circuit controller 1-10 transmits the facsimile data on the internet protocol network in accordance with the above determination by the supervisor 1-6.

The information to be set up into the control table 1-5 includes the transmission timing data which is formed of a waiting time and an arrival time, for transferring the facsimile data within a predetermined delay time that is allowed based on the service level for communication. Further, it is possible to set up a variable threshold value in the control table 1-5 in accordance with the transmission timing based on the service level for communication.

When the load state of the circuit exceeds the threshold value in the supervisor 1-6, and when the supervisor 1-6 determines no necessity for the immediate transfer, the facsimile data is temporarily stored in the data accumulator 1-7, and held therein as a waiting queue until next opportunity of the transmission.

Figure 4:
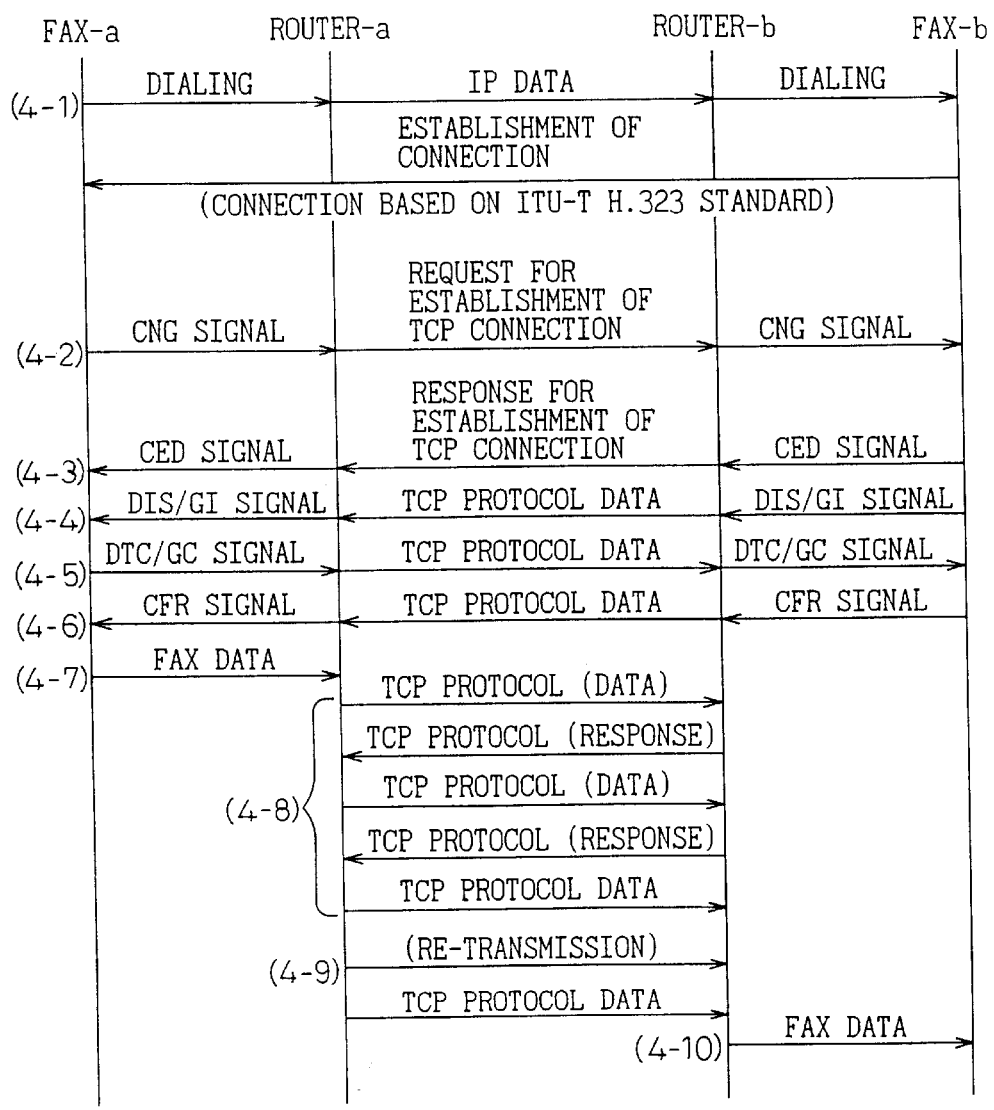
FIG. 4 is a sequence chart of transmission of the facsimile data according to the present invention.

FIG. 4 is a sequence chart of transmission of facsimile data according to the present invention. In this sequence chart, the facsimile apparatus "FAX-a" and the router "ROUTER-a" are provided in the sending side, and the facsimile apparatus "FAX-b" and the router "ROUTER-b" are provided in the reception side (i.e., a destination facsimile).

In step 4-1, when the FAX-a performs dialing to the ROUTER-a in order to set up a call, the ROUTER-a transmits a telephone number of the destination to the ROUTER-b in accordance with the UDP. The ROUTER-b calls the FAX-b based on the telephone number, and establishes the UDP connection based on the ITU-T H.323 standard between the ROUTER-a and the ROUTER-b.

In step 4-2, the FAX-a sends the CNG signal to the ROUTER-a. The ROUTER-a converts the CNG signal to the request for the TCP connection, and transmits the request for the TCP connection to the ROUTER-b. Further, the ROUTER-b converts the request for the TCP connection to the CNG signal, and transmits the CNG signal to the FAX-b.

In step 4-3, the FAX-b sends the CED signal to the ROUTER-b in response to reception of the CNG signal. The ROUTER-b converts the CED signal to the response for the TCP connection, and transmits the response for the TCP connection to the ROUTER-a. The ROUTER-a converts the response for the TCP connection to the CED signal, and sends the CED signal to the FAX-a.

In step 4-4, the FAX-b sends a DIS or GI signal, which indicates identification and selection of various functions of the facsimile apparatus, to the FAX-a as the TCP data.

In step 4-5, the FAX-a transmits a DTC signal, or a GC signal, or a phase matching signal, which designates the communication mode, to the FAX-b, as the TCP data.

In step 4-6, the FAX-b transmits a reception ready completion signal CFR to the FAX-a based on the TCP.

In step 4-7, after completion of the above steps based on the T-30 transmission control procedure (ITU-T), the FAX-a sends the facsimile data to the ROUTER-a.

In step 4-8, the ROUTER-a transmits the facsimile data with a sequence number based on the TCP, to the ROUTER-b. The ROUTER-b returns a response signal including the sequence number for confirming reception, to the ROUTER-a based on the TCP.

In step 4-9, the ROUTER-a and ROUTER-b supervise continuity and the check sum of the sequence number and a confirmation response number which are stored in the TCP header shown in FIG. 3, so that these ROUTERs can detect loss or abnormal reception of the facsimile data. The sequence number of the facsimile data which occurred a transmission error is announced from the ROUTER-b to the ROUTER-a. When the ROUTER-a receives the sequence number, the ROUTER-a re-transmits the facsimile data which occurred the transmission error to the ROUTER-b. As a result, it is possible to perform an error recovery process for the transmission error and to realize data transfer with high reliability.

In step 4-10, the ROUTER-b transmits the facsimile data which was transmitted from the ROUTER-a, to the FAX-b.

Figure 5:
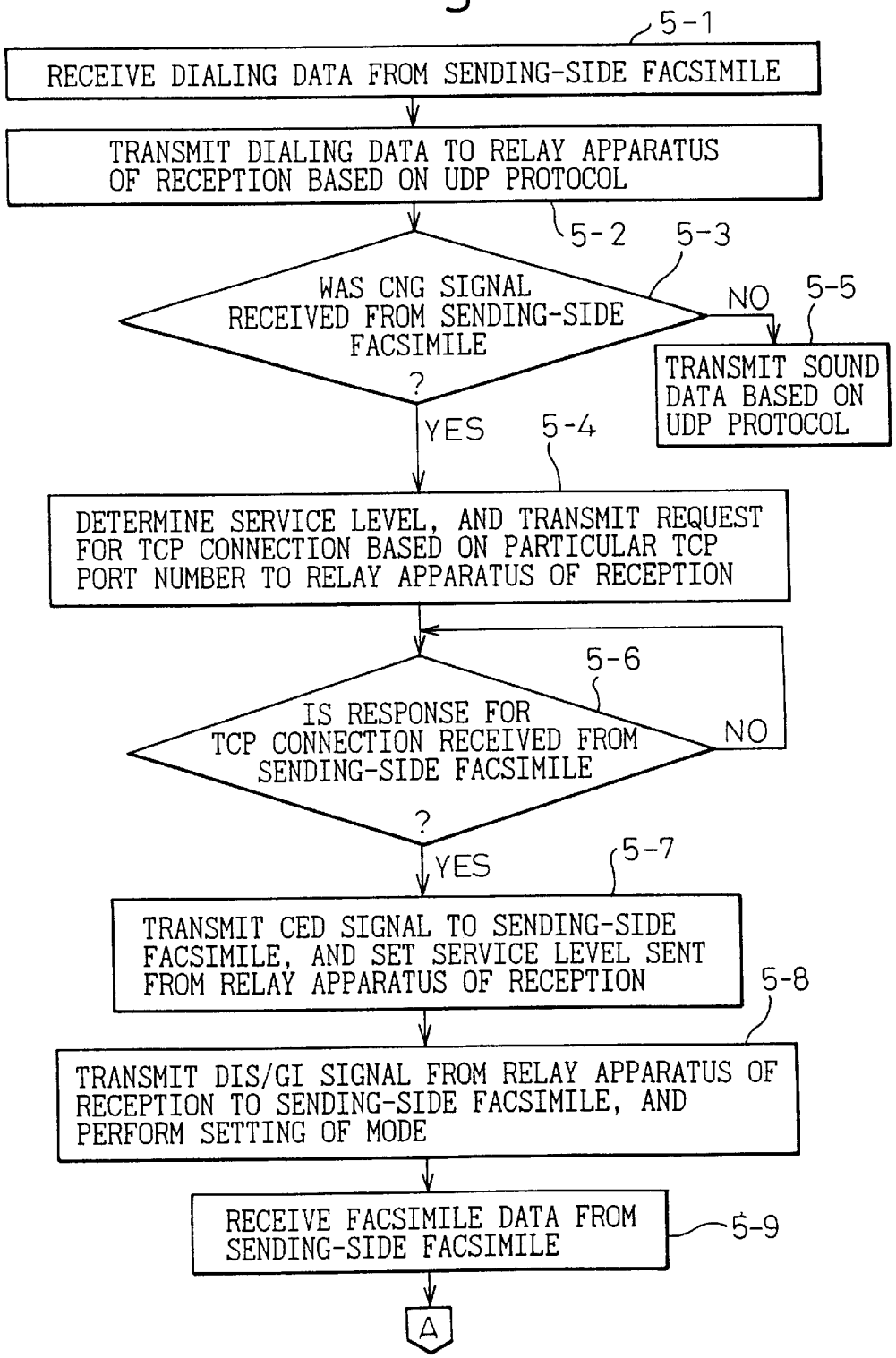
FIGS. 5 and 6 are flowcharts for explaining the operation in a relay apparatus of sending side.
Figure 6:
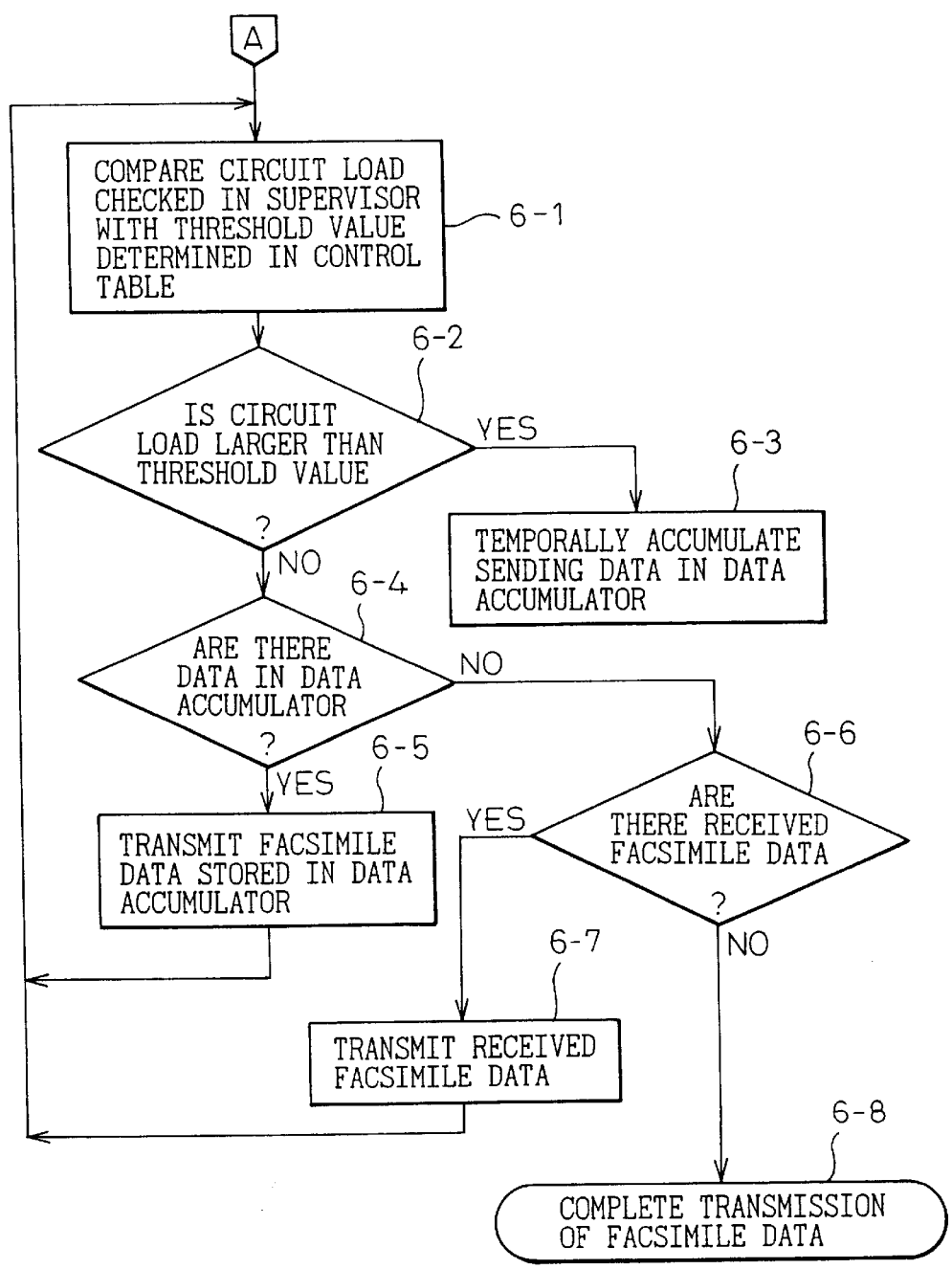

FIGS. 5 and 6 are flowcharts for explaining the operation in the relay apparatus of the sending side. When the relay apparatus 1-10 of the sending side receives a dialing signal sent from the facsimile apparatus 1-31 (or 1-41) of the sending side (step 5-1), the relay apparatus 1-10 sends the dialing information to the relay apparatus 1-20 of the reception side in accordance with the UDP (step 5-2).

Further, the relay apparatus 1-10 of the sending side supervises whether the CNG signal indicating a tonal procedure or binary procedure is received from the facsimile apparatus 1-31 (step 5-3). When the relay apparatus 1-10 receives the CNG signal from the facsimile apparatus 1-31 (YES), the relay apparatus 1-10 determines the service level for communication, and transmits the request for the TCP connection based on a particular TCP port number to the relay apparatus 1-20 of the reception side (step 5-4).

On the other hand, when the relay apparatus 1-10 of the sending side does not receive the CNG signal from the facsimile 1-31 (NO in step 5-3), the relay apparatus 1-10 transmits the sound data to the relay apparatus 1-20 in accordance with the UDP as the reception data from the facsimile 1-31 (step 5-5).

The relay apparatus 1-10 of the sending side determines whether the response for the TCP connection is received in the relay apparatus 1-20 of the reception side, in response to the request for the TCP connection sent from relay apparatus 1-10 (step 5-6). When the relay apparatus 1-10 of the sending side confirms that the request for the TCP connection was received in the relay apparatus 1-20 of the reception side (YES), the relay apparatus 1-10 of the sending side sends the CED signal to the facsimile apparatus 1-31 of the sending side, and stores the service level for communication, which was contained within the response for the TCP connection from the relay apparatus 1-20, into the control table 1-5 in the relay apparatus 1-10 (step 5-7).

Further, the relay apparatus 1-20 of the reception side transmits the DIS/Gl signal, the CIF signal, etc., which were sent from the relay apparatus 1-10 of the sending side, as the DIS/Gl signal, the CIF signal, etc., which represent the tonal procedure or the binary procedure. The relay apparatus 1-10 of the sending side performs setting of communication mode for the facsimile apparatus of the sending side and the facsimile apparatus of the reception side so that it is possible to establish conditions of transmission and reception of the facsimile data (5-8).

Still further, the relay apparatus 1-10 of the sending side receives the facsimile data sent from the facsimile apparatus 1-31 of the sending side (step 5-9), and starts transmission of the facsimile data to the relay apparatus 1-20 of the reception side in accordance with steps shown in FIG. 6.

In FIG. 6, in the relay apparatus 1-10 of the sending side, the circuit controller 1-1 compares the load state of the circuit (below, circuit load), which is informed from the supervisor 1-6, with the threshold value of the circuit load stored in the control table 1-5 (steps 6-1). When the circuit load is larger than the threshold value (YES, in step 6-2), the facsimile data sent from the facsimile apparatus 1-31 of the sending side is temporarily stored in the data accumulator 1-7 (step 6-3).

On the other hand, when the circuit load is smaller than the threshold value (NO), the circuit controller confirms whether there are facsimile data already accumulated in the data accumulator (step 6-4).

When there are the facsimile data already accumulated in the data accumulator 1-6, the circuit controller transmits the accumulated data to the relay apparatus 1-20 of the reception side (step 6-5). After transmission, the process returns to the step 6-1. On the other hand, when there are no facsimile data accumulated in the data accumulator 1-6 (NO in step 6-4), the circuit controller checks whether the facsimile data is currently received (step 6-6). When there is the facsimile data currently received in the relay apparatus 1-10 (YES), the relay apparatus 1-10 transmits the facsimile data to the relay apparatus 1-20 of the reception side (step 6-7). When there are no facsimile data currently received in the relay apparatus 1-10 (NO), the relay apparatus 1-10 completes the transmission of the facsimile data (step 6-8).

In the case of transmission of the facsimile data, the relay apparatus 1-10 of the sending side transmits the facsimile data to the relay apparatus 1-20 of the reception side in accordance with the same coding method as the sound data. When the facsimile data to be sent from the facsimile apparatus 1-31 to the relay apparatus 1-10, the relay apparatus 1-10 transmits an EOP signal indicating completion of procedures of transmission to the relay apparatus 1-20 of the reception side so that it is possible to complete the transmission of the facsimile data.

Figure 7:
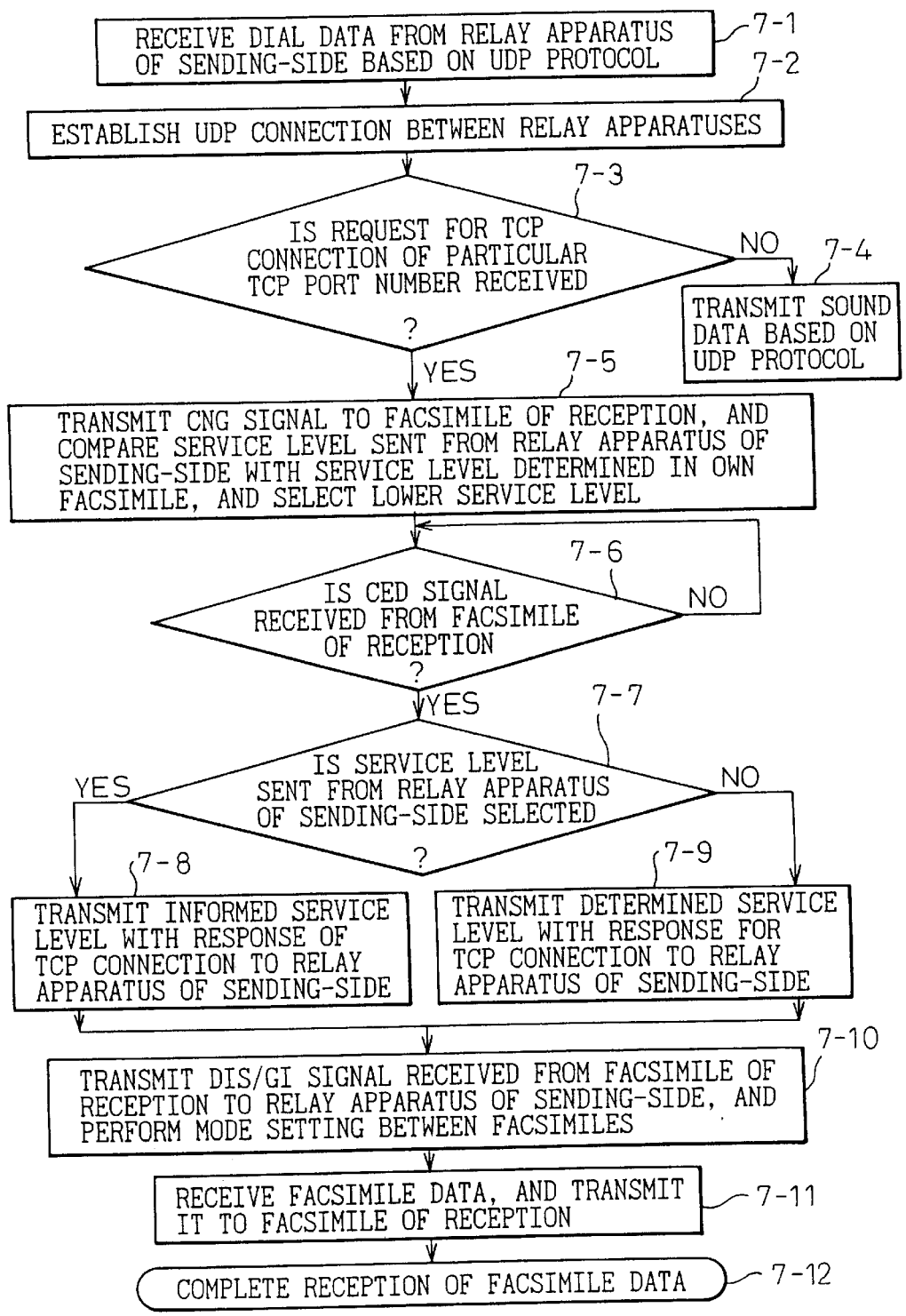
FIG. 7 is a flowchart for explaining the operation in a relay apparatus of reception side.

FIG. 7 is a flowchart for explaining the operation in the relay apparatus of the reception side. When the relay apparatus 1-20 of the reception side receives the dialing signal from the relay apparatus 1-10 of the sending side based on the UDP (step 7-1), the relay apparatus 1-20 establishes the UDP connection between the relay apparatus 1-10 of the sending side and the relay apparatus 1-20 of the reception side (7-2).

Further, the relay apparatus 1-20 of the reception side checks whether the request for the TCP connection based on the particular TCP port number was received in accordance with reception of the CNG signal transmitted from the relay apparatus 1-10 of the sending side (step 7-3). When the request for the TCP connection has not yet been received in the relay apparatus 1-20 (NO), the relay apparatus 1-20 determines as the request is not transmission of the facsimile data, and receives the sound data in accordance with the UDP (step 7-4).

On the other hand, when the relay apparatus 1-20 of the reception side receives the request for the TCP connection based on the particular TCP port number, the relay apparatus 1-20 sends the CNG signal to the facsimile apparatus 1-32 of the reception side. Further, the circuit controller 1-2 in the relay apparatus 1-20 compares the service level for communication, which was transmitted from the relay apparatus 1-10 of the sending side with the request for the TCP connection, with the service level for communication previously stored in the control table 1-5 in the relay apparatus 1-20. After the above comparison, the circuit controller 1-2 selects the service level having a lower level (step 7-5) (i.e., one of service levels is selected between the service level from the sending side and the service level previously stored in the reception side).

In this case, it is possible to correspond the service level for communication, which was transmitted from the relay apparatus 1-10 of the sending side, to the TCP port number. Further, the threshold values for the circuit load stored in the control table 1-5 are different from each other in accordance with the service level for communication.

Further, the relay apparatus 1-20 of the reception side checks whether the CED signal is received from the facsimile apparatus 1-32 (step 7-6). When the relay apparatus 1-20 receives the CED signal from the facsimile apparatus 1-32 (YES), and when the relay apparatus 1-20 selects the service level with the request for the TCP connection which was transmitted from the relay apparatus 1-10 of the sending side (YES, in step 7-7), the relay apparatus 1-20 transmits the selected service level to the relay apparatus 1-10 of the sending side with the response for the TCP connection (step 7-8).

On the other hand, when the service level previously stored in the control table 1-5 in the reception side was selected in step 7-5 (NO, in step 7-7), the relay apparatus 1-20 transmits the stored service level to the relay apparatus 1-10 of the sending side with the response for the TCP connection (step 7-9).

Further, the relay apparatus 1-20 of the reception side transmits the DIS/GI signal, the CFR signal, etc., which were received from the relay apparatus 1-10 in accordance with the tonal procedure or the binary procedure, to the relay apparatus 1-10 of the sending side based on the TCP data. After transmission of these signals, the communication mode is set between the relay apparatus 1-10 of the sending side and the relay apparatus 1-20 of the reception side (step 7-10) so that it is possible to establish transmission and reception of the facsimile data.

The relay apparatus 1-20 receives the facsimile data transmitted from the facsimile apparatus 1-31 of the sending side through the relay apparatus 1-10 and the internet protocol network, and sends the facsimile data to the facsimile apparatus 1-32 of the reception side through the telephone line (step 7-11) so that it is possible to complete transmission and reception of the facsimile data.

What is claimed is:

1. A method for transmitting facsimile data between a facsimile apparatus of a sending side and a facsimile apparatus of a reception side, the facsimile apparatus of the sending side being connected to a relay apparatus of the sending side, the facsimile apparatus of the reception side being connected to a relay apparatus of the reception side, and the relay apparatus of the sending side being connected to the relay apparatus of the reception side through an internet protocol network, comprising steps of:

performing an address conversion from a telephone number of a facsimile apparatus of the reception side, which is transmitted from a facsimile apparatus of the sending side when setting a call, to an IP address corresponding to the telephone number;

transmitting a request for establishment of TCP connection including a flow control and re-transmission function, to a relay apparatus corresponding to a destination of the IP address, when receiving an identifying signal which indicates transmission of the facsimile data from the facsimile apparatus of the sending side; and transmitting the facsimile data to the relay apparatus corresponding to the destination of the IP address based on the TCP connection.

2. A method for transmitting facsimile data as claimed in claim 1, wherein the above step of transmitting the facsimile data based on the TCP connection comprises a step of comparing a circuit load in the internet protocol network with a threshold value which was previously determined based on a service level for communication for transmitting the facsimile data, and transmitting the facsimile data when the circuit load is smaller than the threshold value.

3. A method for transmitting facsimile data as claimed in claim 2, wherein the above step of transmitting the facsimile data based on the TCP connection comprises a step of controlling transmission timing of the facsimile data based on transmission timing which was previously determined in accordance with the circuit load and service level of communication.

4. A method for transmitting facsimile data as claimed in claim 1, wherein the above step of transmitting the request for establishment of the TCP connection comprises a step of transmitting a particular port number, which indicates transmission of the facsimile data, with the request for establishment of the TCP connection.

5. A relay apparatus connected to facsimile apparatuses and further connected to an internet protocol network, comprising:

an address conversion means for performing an address conversion from a telephone number of a facsimile apparatus of the reception side, which is transmitted from a facsimile apparatus of the sending side when setting a call, to an IP address corresponding to the telephone number;

a transmitting means for transmitting a request for establishment of TCP connection including a flow control and re-transmission function, to a relay apparatus corresponding to a destination of the IP address, when receiving an identifying signal which indicates transmission of the facsimile data from the facsimile apparatus of the sending side; and a transmitting means for transmitting the facsimile data to the relay apparatus corresponding to the destination of the IP address based on the TCP connection.

6. A relay apparatus connected to an internet protocol network and a facsimile apparatus as claimed in claim 5, wherein the means for transmitting the facsimile data based on the TCP connection comprises a means for comparing a circuit load in the internet protocol network with a threshold value which was previously determined based on a service level for communication for transmitting the facsimile data; a means for transmitting the facsimile data when the circuit load is smaller than the threshold value; and a means for temporally accumulating the facsimile data.

7. A relay apparatus connected to an internet protocol network and a facsimile apparatus as claimed in claim 6, wherein the means for transmitting the facsimile data based on the TCP connection comprises a means for controlling transmission timing of the facsimile data based on transmission timing which was previously determined in accordance with the circuit load and service level of communication.

8. A relay apparatus connected to an internet protocol network and a facsimile apparatus as claimed in claim 5, wherein the means for transmitting the request for establishment of the TCP connection comprises a structure of transmitting a particular port number, which indicates transmission of the facsimile data, with the request for establishment of the TCP connection.

* * * * *